United States Patent [19]
Miller

[11] Patent Number: 5,983,925
[45] Date of Patent: Nov. 16, 1999

[54] DIRT FREE VALVE

[76] Inventor: Paul D. Miller, 4050 E. Old Bombing Range Rd., Avon Park, Fla. 33825

[21] Appl. No.: 08/879,624
[22] Filed: Jun. 20, 1997
[51] Int. Cl.$^6$ ....................................................... F16K 5/00
[52] U.S. Cl. .............................. 137/371; 137/363; 137/364
[58] Field of Search ...................... 137/363, 364, 137/371; 52/20

[56] References Cited

U.S. PATENT DOCUMENTS

| | | | |
|---|---|---|---|
| 1,582,191 | 4/1926 | Snooke | 137/363 |
| 3,385,012 | 5/1968 | Lovegreen | 137/363 |
| 3,601,143 | 8/1971 | Clennon | 137/364 |
| 3,746,034 | 7/1973 | Cosson | 137/364 |
| 4,065,020 | 12/1977 | Carson | 220/18 |
| 4,325,405 | 4/1980 | Christo . | |
| 4,333,494 | 6/1980 | Shope | 137/364 |
| 4,340,081 | 7/1980 | Watson | 137/364 |
| 4,905,725 | 3/1990 | Landis | 137/370 |
| 5,327,925 | 7/1994 | Ortel | 137/366 |
| 5,361,799 | 11/1994 | Chilton et al. | 137/363 |
| 5,584,317 | 12/1996 | McIntosh | 137/363 |

*Primary Examiner*—A. Michael Chambers

[57] ABSTRACT

A dirt free valve with a valve (12) of assorted sizes inside of a molded casing (16) with inlet (24) and outlet (26) to accomodate various sized pipe for the flow of different materials, with drainage holes in the bottom (20) and a cover (10) that can be removed by hand.

3 Claims, 1 Drawing Sheet

DIRT FREE VALVE

BACKGROUND—FIELD OF INVENTION

This invention relates to an improved underground valve box for use with water lines, gas lines, sewer lines, or irrigation lines that are buried under the ground.

BACKGROUND—DESCRIPTION OF PRIOR ART

A water, gas, or sewer main is connected to a building via a service line which extends from the main to the building under the ground. The service line is provided with a service line shut-off valve assembly, typically near the curb. These valves are commonly housed in a valve box.

Today valve boxes are made of different types of material, including cast iron, plastic, synthetic pipe, and others. Inventors previously invented several valve boxes as kits that had to be assembled as in U.S. Pat. No. 5,327,925 to Ortel (1994).

If such valves leaked water, or if water got into the box, there was no provision for drainage of the waster water as in U.S. Pat. Nos. 4,905,725 to Thomas & Landis (1990) and 4,340,081 to Watson (1980).

One of the most common forms of valve boxes made today comes in different shapes and sizes but have no bottom. When you open the top of the valve box and put in your hand or elongated wrench you had no idea what you would find in the box. Several of these no-bottom valve boxes are: U.S. Pat. Nos. 4,333,494 to Shope (1980), 4,325,405 to Christo (1980), 4,065,020 to Carson (1977), 3,746,034 to Cosson (1973), and 3,601,143 to Clennon (1971).

Another further object and advantage of my invention is to provide a dirt free valve and box that is easily installed by homeowner or plumber. Still further objects and advantages of my invention will become apparent from a consideration of the ensuing description and drawings.

OBJECTS AND ADVANTAGES

Accordingly, several objects and advantages of my invention are:

(a) to provide a valve box that is of one piece plus a cover;
(b) to provide a valve box with different sized valves and fittings;
(c) to provide a valve box with valves of different materials;
(d) to provide a valve box that has holes in the bottom for drainage;
(e) to provide a valve box that remains free of any foreign objects.

Further objects and advantages of my invention will become apparent from a consideration of the drawings and ensuing description.

DRAWING FIGURES

REFERENCE NUMERALS IN DRAWINGS

| | |
|---|---|
| 10 cover, lid, or top | 20 bottom of molded casing |
| 12 valve (can be of different sizes) | 22 drainage holes in bottom of casing |
| 14 valve handle | 24 fitting for inlet |
| 16 molded casing | 26 fitting for outlet |
| 18 sides of molded casing | 28 handle for cover |

SUMMARY OF INVENTION

The invention described and claimed herein comprises a valve inside of a covered molded casing with inlet and outlet fittings for connection to gas, water, sewer or irrigation lines.

DESCRIPTION—FIG. 1 AND FIG. 2

Figure 1:
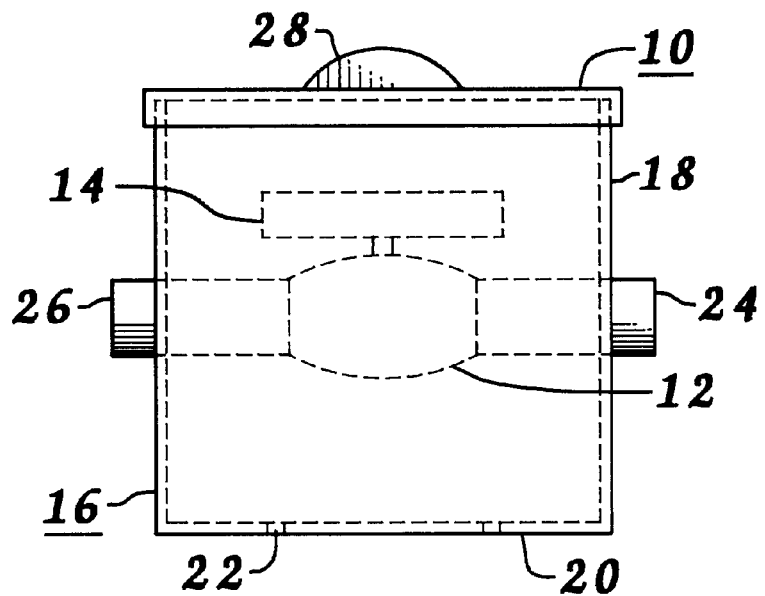
FIG. 1 shows a side view of the valve inside the molded casing

The character of the invention, however, may be best understood by reference to its structural form, as illustrated by the accompanying drawings, in which:

The dirt free valve shown in FIG. 1 is designed to be connected to underground water, gas, sewer or irrigation lines.

FIG. 1 shows the one piece molded casing (16) attached to a inlet fitting (24). The inlet fitting (24) is attached to a valve (12) which has a handle (14) suitable for controlling the flow of material in the line to which it is connected. The other side of the valve (12) is connected to the outlet fitting (26). The outlet (26) and the inlet (24) are part of a molded casing (16) that includes sides (18) with a bottom (20) and a cover (10) with a handle (28).

Figure 2:
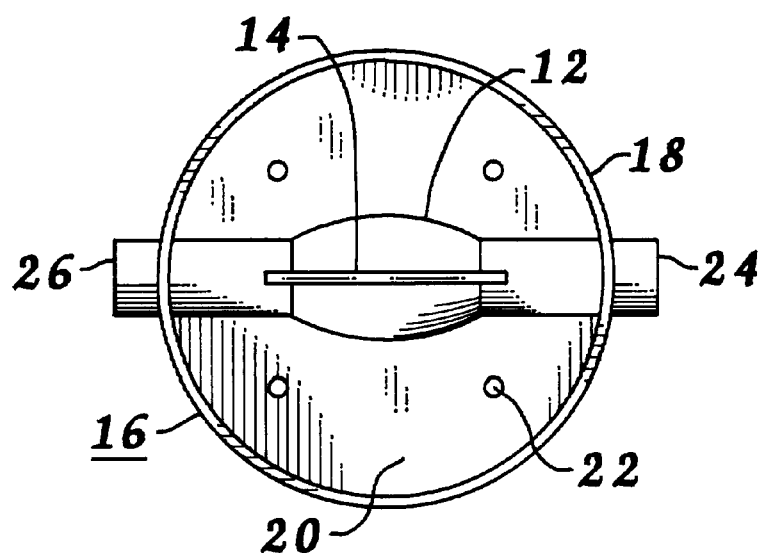
FIG. 2 shows a top view of molded casing with the valve inside and the drainage holes in the bottom. The casing is underground.

FIG. 2 shows the top view of the dirt free valve with a bottom (20) that has drainage holes (22) in it.

OPERATION OF INVENTION

The invention described and claimed herein comprises a molded casing (16) out of a suitable material which has a bottom (20) with drainage holes (22) and a valve (12) with a valve handle (14) as seen in FIG. 1 and FIG. 2. With the cover or lid (10) in place, no foreign object can get inside.

In FIG. 1 you find a molded casing (16) with sides (18) where there is an inlet (24) and outlet (26) from which the material flows.

The valve (12) with handle regulates the flow of material either on or off.

The cover (10) with handle (28) is made of a suitable material so that it is easy to access the valve (12).

In FIG. 2 the drainage holes (22) in the bottom of the molded casing (16) are to allow for drainage of liquid from the interior casing.

SUMMARY, RAMIFICATION, AND SCOPE

This dirt free valve eliminates the nuisance of undesirable objects (such as sand, snakes, etc.) in close proximity to the valve.

While the above description contains many specificity's, these should not be construed as limitations on the scope of the invention, but rather as an exemplification of one preferred embodiment thereof. Many other variations are possible. For example:

easily installed by average homeowner or plumber
the casing can be made of many different materials
the casing can be made to accommodate different sized valves different sized valves can be used different sized inlet and outlet can be used to accommodate different sized service pipe.

Thus the scope of the invention should be determined by the appended claims and their legal equivalents, rather than by the examples given.

I claim:

1. A housing for a valve, the valve positioned in a flow pipe, the valve having a first connection side and a second connection side, the flow pipe having an inlet pipe attached to the first connection side of the valve and an outlet pipe attached to the second connection side of the valve, the valve to provide for a control over the passage of a material from the inlet pipe to the outlet pipe, the valve contained within the housing, the housing to provide for maintaining the valve in a dirt free status, the housing comprising:

a) a one piece molded encasing member comprising:
      1) a bottom having a perimeter:
      2) a wall extending upward from all points of the perimeter of the bottom, the wall having a first hemisphere and a second hemisphere wherein the bottom and the wall define an interior of the encasing member having an opening positioned distal from the bottom;
      3) a first aperture penetrating the wall on the first hemisphere and above the bottom, the first aperture to provide for passage of the inlet pipe into the encasing member;
      4) a second aperture penetrating the wall on the second hemisphere and above the bottom, the second aperture to provide for passage of the outlet pipe into the encasing member;
      wherein the valve positioned between the inlet pipe and the outlet pipe is positioned within the interior of the encasing member at above the bottom;

b) a detachable cover to provide for closing the opening of the encasing member wherein the detachable cover may be repetitive removal from the encasing member, the repositioning on the encasing member, the removal to provide for access to the interior of the encasing member through the opening of the encasing member, the access to provide for user manipulation of the valve contained within the encasing member.

2. A housing for a valve, the valve positioned in a flow pipe, the valve having a first connection side and a second connection side, the flow pipe having an inlet pipe attached to the first connection side of the valve and an outlet pipe attached to the second connection side of the valve, the valve to provide for a control over the passage of a material from the inlet pipe to the outlet pipe, the valve contained within the housing, the housing to provide for maintaining the valve in a dirt free status, the housing comprising, a) a one piece molded encasing member comprising:
      1) a bottom having a perimeter;
      2) a wall extending upward from all points of the perimeter of the bottom, the wall having a first hemisphere and a second hemisphere wherein the bottom and the wall define an interior of the encasing member, the encasing member having an opening positioned distal from the bottom;
      3) a first aperture penetrating the wall on the first hemisphere and generally midpoint between the bottom and the opening, the first aperture to provide for passage of the inlet pipe into the encasing member;
      4) a second aperture penetrating the wall on the second hemisphere and generally midpoint between the bottom and the opening, the second aperture to provide for passage of the outlet pipe into the encasing member;

wherein the first aperture and the second aperture generally opposing each other on opposing hemispheres of the encasing member and wherein the valve positioned between the inlet pipe and the outlet pipe is positioned within the interior of the encasing member at a generally midpoint between the bottom and the opening;

b) a detachable cover to provide for closing the opening of the encasing member wherein the detachable cover may be repetitive removal from the encasing member and repositioning on the encasing member, the removal to provide for access to the interior of the encasing member through the opening of the encasing member, the access to provide for user manipulation of the valve contained within the encasing member.

3. A housing for a valve, the valve positioned in a flow pipe, the valve having a first connection side and a second connection side, the flow pipe having an inlet pipe attached to the first connection side of the valve and an outlet pipe attached to the second connection side of the valve, the valve to provide for a control over the passage of a material from the inlet pipe to the outlet pipe, the valve contained within the housing, the housing to provide for maintaining the valve in a dirt free status, the housing comprising:

a) a one piece molded encasing member comprising:
      1) a round bottom having a perimeter and a circular shape:
      2) a radically disposed wall extending upward from all points of the perimeter of the round bottom, the radically disposed wall having a first hemisphere and a second hemisphere wherein the round bottom and the radically disposed wall define an interior of the encasing member, the encasing member having an round opening positioned distal from the round bottom;
      3) a first aperture penetrating the radically disposed wall on the first hemisphere and above the round bottom, the first aperture to provide for passage of the inlet pipe into the encasing member;
      4) a second aperture penetrating the radically disposed wall on the second hemisphere and above the round bottom, the second aperture to provide for passage of the outlet pipe into the encasing member;

wherein the first aperture and the second aperture generally opposing each other on opposing hemispheres of the encasing member and wherein the valve positioned between the inlet pipe and the outlet pipe is positioned within the interior of the encasing member above the round bottom;

5) a plurality of apertures penetrating the round bottom, each of the plurality of apertures to provide for a draining of any fluids which collect on the round bottom of the encasing member;

b) a detachable cover to provide for closing the round opening of the encasing member wherein the detachable cover may be repetitive removal from the encasing member and repositioning on the encasing member, the removal to provide for access to the interior of the encasing member, the access to provide for user manipulation of the valve contained within the encasing member.

* * * * *